May 21, 1968  E. F. GLASS ET AL  3,383,844
DEFLECTOR STRUCTURE
Filed April 1, 1965  2 Sheets-Sheet 1
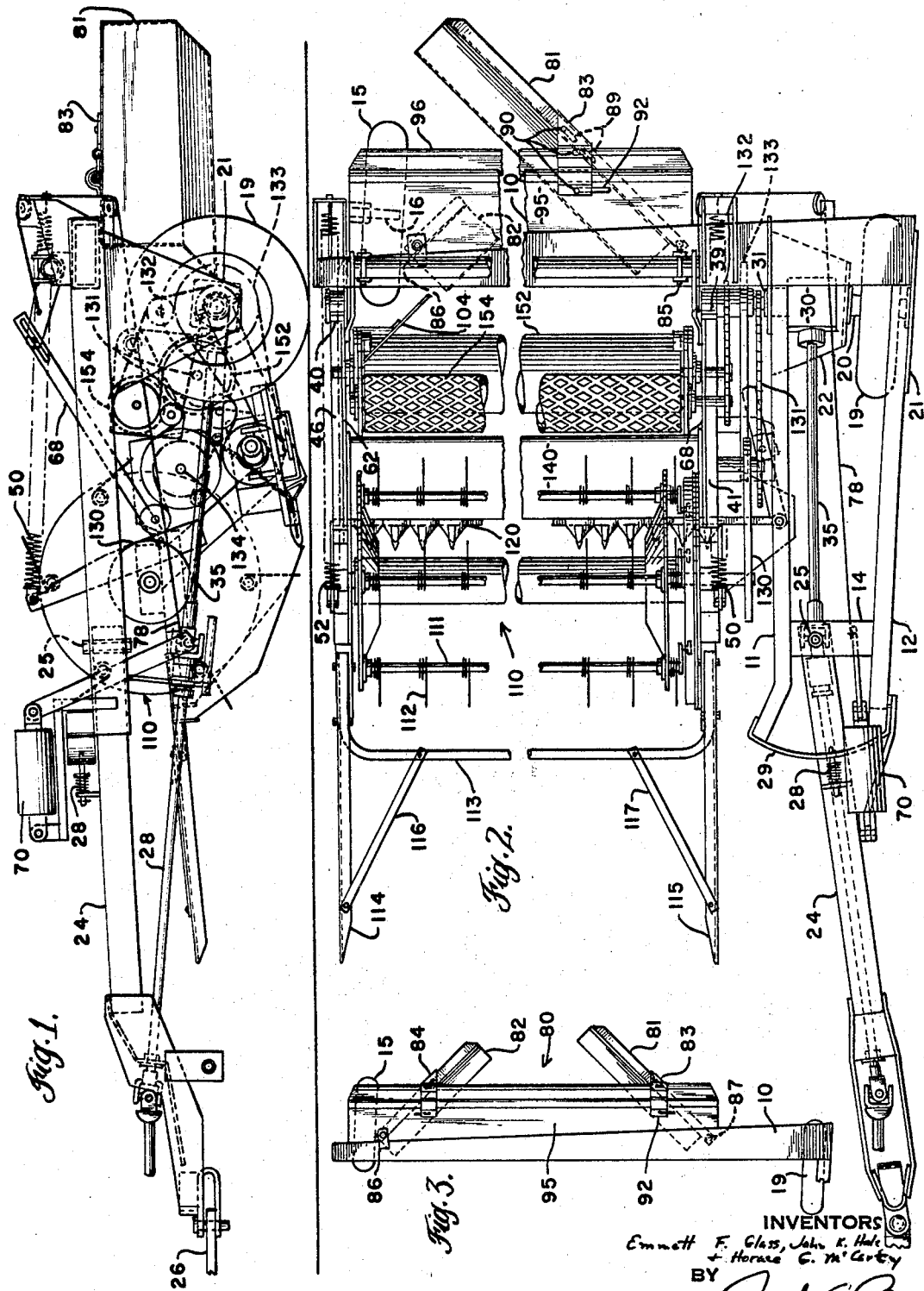
INVENTORS
Emmett F. Glass, John K. Hale
+ Horace E. McCarty
BY
Joseph C. Brown
ATTORNEY

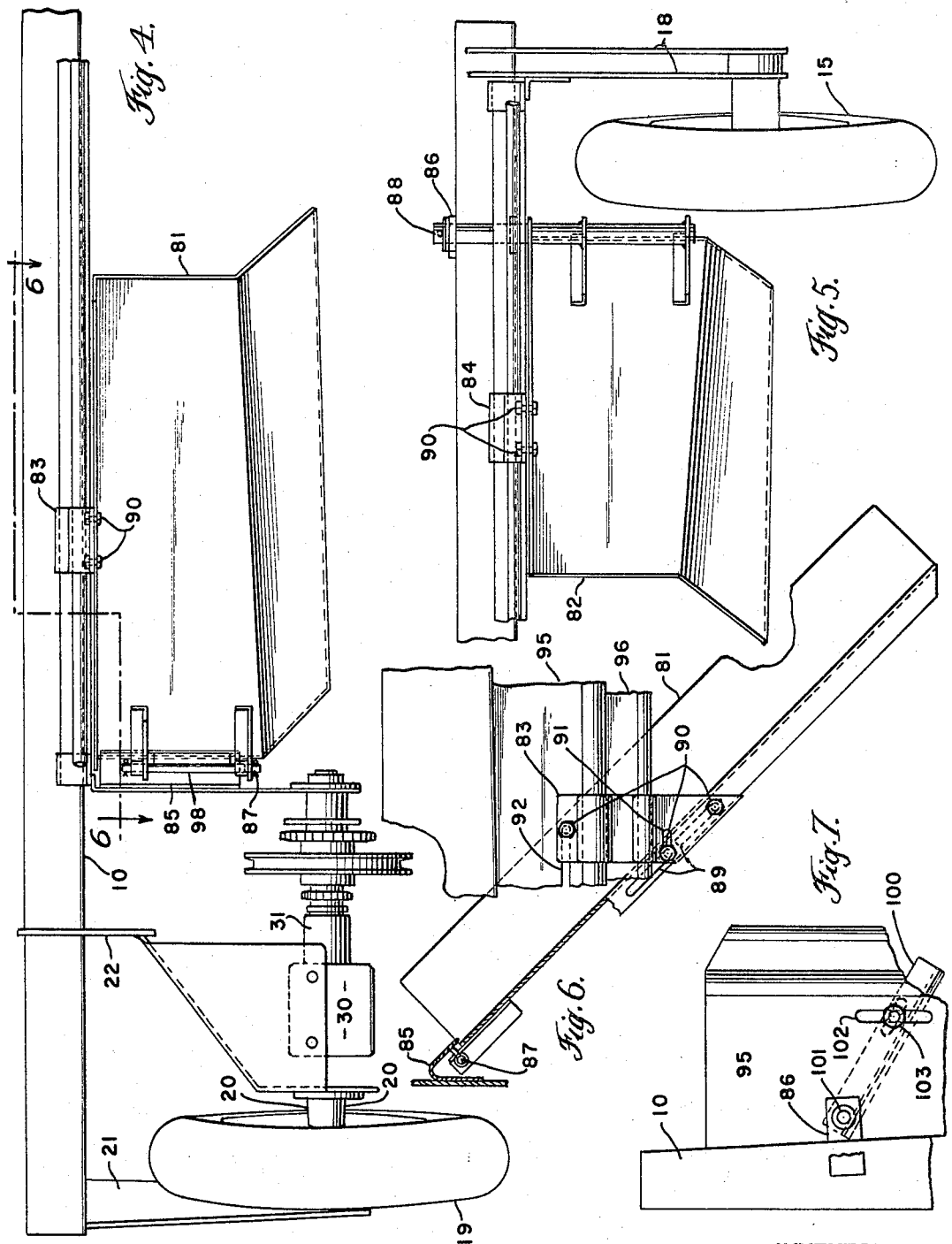

United States Patent Office 3,383,844
Patented May 21, 1968

3,383,844
DEFLECTOR STRUCTURE
Emmett F. Glass, Akron, and John K. Hale and Horace G. McCarty, New Holland, Pa., assignors to Sperry Rand Corporation, New Holland, Pa., a corporation of Pennsylvania
Filed Apr. 1, 1965, Ser. No. 444,647
11 Claims. (Cl. 56—23)

ABSTRACT OF THE DISCLOSURE

A harvester having a mower, conditioner rolls, and windrowing means in which the stream of material discharged to the windrowing means by the conditioner rolls is substantially the same width as the swath cut by the mower.

---

This invention relates to an implement for harvesting hay or the like, and more specifically to means for controlling the discharge of hay from the implement.

Harvesting machines, of the type to which the present invention is particularly applicable, comprise generally a forwardly located sickle, a rotating reel above the sickle and a pair of conditioning rolls mounted rearwardly of the sickle and reel. The reel moves the severed crop material rearwardly from the sickle to the conditioning rolls. The conditioned material is discharged by the rolls to some type of discharge control means.

In some types of hay and under some moisture conditions, it is desirable to discharge the conditioned material in wide swaths so that maximum drying is obtained. Usually, however, if moisture conditions permit, the farmer will want the hay formed into windrows so that a subsequent raking operation is eliminated. Even when the crop material is discharged in swaths, it is desirable to use some type of discharge control means which will form a cleared path between cut material and the standing crop. Thus, the implement wheels may pass in this path on the next cutting and avoid running over the mown hay.

Discharge control means have been previously employed on harvesters to perform either the windrowing or swath dividing functions. However, these prior art devices have the disadvantage that they cannot be adapted to perform both discharge control operations. Further, the known discharge controls are cumbersome and time consuming to remove and install.

Accordingly, one object of this invention is to provide a harvesting device of the character described with novel and improved discharge control means.

Another object of this invention is to provide a harvesting device of the character described with discharge control means which may be adapted to perform either a windrowing or swath dividing operation.

Another object of this invention is to provide a harvesting device with a single mounting means for selectively receiving a windrow-forming side shield or a swath dividing shield.

A further object of this invention is to provide a harvesting device with divider means which will uniformly separate and guide the standing crop into the sickle and reel.

A still further object of this invention is to provide a harvesting device with adjustable discharge control means whereby the ground width of the discharged material may be regulated.

Other objects of this invention will be apparent hereinafter from the specification and from the recital in the appended claims.

In the drawings:

FIG. 1 is a side elevation view of the hay harvesting machine having discharge control means constructed according to this invention and showing the left windrow forming shield of the control means attached thereto;

FIG. 2 is a plan view of the machine shown in FIG. 1 with the central portion of the machine broken out to condense the machine width;

FIG. 3 is a plan view on a reduced scale, showing the transverse frame element and relative locations of the windrow forming side shields attached to the frame;

FIG. 4 is an enlarged end view of the machine shown in FIG. 1 showing a left side portion of the machine rear end;

FIG. 5 is a view similar to FIG. 4 but showing a right side portion of the machine rear end;

FIG. 6 is a plan sectional view taken on lines 6—6 of FIG. 4 showing the pivotal mounting of the left side shield and the adjusting bracket therefor; and FIG. 7 is a plan view showing the swath divider and the location thereof relative to the frame and top shield.

Referring now to the drawings by numerals of reference and particularly to FIGS. 1 and 2, the hay harvesting device of the present invention has a right angular base or main frame structure. A main frame member 10 extends transversely across the width of the machine at the rear thereof. The machine is adapted to travel from right to left as it is seen in FIGS. 1 and 2. At the left side of frame 10, a pair of main frame members 11 and 12 project forwardly and are interconnected near their front ends by transverse frame member 14. At the right side of frame member 10 a ground wheel 15 is journalled on a spindle 16 which is carried by frame plates 18 depending from main frame member 10. At the left side of frame member 10, a ground wheel 19 is journalled on a spindle 20 which is carried by and extends between vertical frame plates 21 and 22 which are fixedly attached to, and depend from, frame members 10, 11 and 12. As shown in FIG. 2, the wheel spindles 16 and 20 may be canted relative to the direction of travel of the frame. A drawbar 24 extends forwardly from frame members 11 and 12 and is connected to tractor drawbar 26, shown fragmentarily. Drawbar 24 is pivotally anchored to main frame member 14 by vertical pivot member 25 for lateral swinging movement between the operative position, as shown in FIG. 2, and a road transport position, not shown. The drawbar may be latched in either position by a spring loaded pin 28 which projects through one of a series of holes, not shown, in latch plate 29 carried by frame members 11 and 12.

A gearbox 30 is disposed adjacent left ground wheel 19. Gearbox 30 has a transversely extending output shaft 31 which constitutes a main drive shaft of the machine. Driving power is supplied to shaft 31 through gear means from a forwardly extending shaft 35. A forward extension 38 of shaft 35 is adapted to be connected to the power take-off system of the towing vehicle.

Depending from frame member 10 and coaxial with drive shaft 31 is a transversely disposed journal 39 (see FIG. 2). Coaxial with journal 39, but at the extreme right side of frame member 10, a similar journal 40 is disposed. A sub-frame structure having forwardly extending elements 41 and 46 is pivotally carried by journals 39 and 40. A pair of long fore-and-aft springs 50, 52 are pivotally connected to the forward end of the sub-frame and counterbalance the weight of the sub-frame structure and the elements which are carried thereby. The sub-frame is therefore free to float relative to the ground about mounting journals 39 and 40 in a substantially weightless manner. A means is provided to raise and lower the sub-frame comprising a hydraulic cylinder 70 which is linked to a flexible cable 78 connected to lift links 62, 68 on the sub-frame.

A reel 110 is mounted on a forward portion of the sub-frame. A plurality of bars 111 carrying tines 112 are mounted around the periphery of the reel. The reel is driven from drive means on the output shaft 31. Crop conditioning rolls 154 and 152 are mounted on an intermediate portion of the sub-frame and are also driven from the main output shaft 31. A sickle 120 is mounted on a lower forward portion of the sub-frame and extends between sub-frame elements 41 and 46. The drive means connecting the various driven elements with the output shaft is shown in FIGS. 1 and 2 and comprises a reel drive belt 130 connected to intermediate pulley 134, a drive chain 131, a conditioner roll drive chain 132 and a mower drive belt 133. The speed reducing drive chain is provided between drive shaft 31 and reel 110, since the rotational speed of the reel 110 is substantially less than that of the conditioner rolls and the sickle drive mechanism. A horizontally disposed plate 140 is provided rearwardly of the mower and serves to guide the crop material from the mower into the conditioner rolls. A vertical guide plate 104 is mounted just rearwardly of the rolls on the right side which serves to guide the material around wheel 15 and into the discharge control means.

Discharge control means is provided rearwardly of the conditioning rolls to guide the material onto the ground in the desired form. As one form of discharge control means, a windrower assembly 80 may be provided. The windrower assembly 80 comprises a left side shield 81, and a right side shield 82 which are mounted on main frame member 10. As best shown in FIGS. 4–6, the right side shield 82 is pivotally connected to right mounting bracket 86 on frame member 10. A pin 88, which is secured to side shield 82 by welding or other means, extends upwardly through mounting bracket 86 and is held therein by a fastener such as a cotter key. The left side shield 81 is pivotally secured to bracket 85 by a pin 87 which passes through sleeve 98 on bracket 85. Both the left and right side shields are also held from pivotal movement by adjusting brackets 83 and 84. As shown in FIG. 6, adjusting bracket 83 is secured to top shield 95 by a bolt 90 inserted in slot 92 in the top shield. The bracket is also fixedly attached to side shield 81 by bolts 90 which are movable in slots 89 in the side shield. It will be seen that the side shield may be adjusted inwardly and outwardly by loosening the bolts 90 and pivoting the shield to the desired location. A right adjusting bracket 84 on right side shield 82 is mounted in the same manner as the left adjusting bracket.

A second form of discharge control is provided by a swath divider 100 which may be mounted to the frame when the windrower assembly has been removed. The swath divider 100 is pivotally connected to right mounting bracket 86 in substantially the same manner as used in connecting right side shield 82. Pin 101 on the swath divider extends upwardly through a portion of the mounting bracket 86 and is held in place by a cotter key or other fastening means. The swath divider is connected to top shield 95 by bolt 103, and the divider may be adjusted by loosening bolt 103 and sliding the bolt in slot 102 on the top shield. See FIG. 7.

A pair of crop dividers 114, 115 are connected to push bar 113 on the forward portion of the harvester. Each of the crop dividers comprises a fore-and-aft extending bar having a pointed forward end and a rear end portion bolted to the push bar. Cross braces 116 and 117 provide additional strength and also serve to direct the crop material inward.

In operation of the machine, the reel, sickle, and conditioning rolls will be driven by the tractor power take-off, as described. As the machine moves forwardly, the crop material will be cut and moved back into the conditioning rolls by the action of the reel 110.

The material discharged rearwardly from the conditioning rolls forms a belt of material substantially the width of the conditioning rolls. When the windrower assembly is mounted on the machine, the material is consolidate as it strikes the side shields and is formed into a windrow. The top shield 95, which extends over a portion of the side shields, guides the material and prevents further upward movement as the discharged material travels rearwardly.

When it is desired to deposit the material in a swath, the windrower shields are removed and swath divider 100 is installed. The swath divider serves to direct the hay discharged from the rolls inwardly, thereby leaving a cleared path between the swath and the standing crop material. One of the main advantages of this path is that a clear area is provided in which the sickle drive may operate without becoming clogged with crop material. Also, under most settings of the swath divider, the path will be of such a width that the left harvester and tractor wheels can travel in the path and avoid running over the mown hay.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. An agricultural implement comprising in combination a mobile frame supported on laterally spaced wheels and adapted for travel in a forward direction, a sickle on the forward portion of said frame, a reel on said frame and above said sickle, a pair of crop conditioning rolls of substantially the same length as said sickle and mounted on said frame rearwardly of said reel for receiving a swath of cut material from said sickle and discharging said material rearwardly in a stream substantially the same width as said swath, a drive assembly mounted on said frame extending in a fore-and-aft direction along one side of said frame, means connecting said sickle, said reel, and said rolls to said drive assembly, a drawbar on said one side of the frame for towing the implement, a horizontally extending top shield on said frame rearwardly of said rolls for guiding material discharged from said rolls, a pair of windrow forming generally vertically extending side shields mounted on opposite sides of said frame, said side shields extending under said top shield and rearwardly thereof, said side shields converging toward each other as they extend rearwardly, said pair of side shields consisting of a right side shield on a second side of said frame opposite said one side and a left side shield on said frame adjacent said one side, a first mounting mean for detachably connecting said right side shield to said frame, a second mounting means for detachably connecting said left side shield to said frame and said first mounting means being adapted to selectively attach said right side shield or a swath divider to said frame, whereby material discharged from said rolls is consolidated and formed into a windrow when said side shields are attached to said frame, and material discharged from said rolls falls into a swath with a cleared path between the swath and standing crop material when said side shields have been removed and said swath divider is attached to said frame.

2. An agricultural implement, as recited in claim 1, wherein said right side shield is pivotally connected to said frame by said first mounting means, said left side shield is pivotally connected to said frame by said second mounting means, a first adjusting bracket is connected to said right side shields and to said top shield, a second adjusting bracket is connected to said left side shield and to said top shield, and said brackets are movable laterally relative to said top shield to adjust the width of said windrow.

3. An agricultural implement, as recited in claim 1, wherein said swath divider may be pivotally connected to said first mounting means, and said swath divider is movable relative to said top shield between two laterally spaced points on said top shield to adjust the width of said cleared path.

4. An agricultural implement, as recited in claim 1, wherein each of said side shields is formed with a vertical side portion and an inwardly directed bottom portion at an angle to said vertical side portion.

5. An agricultural implement as recited in claim 1, wherein a laterally extending push bar is mounted on a forward portion of said frame in front of said reel and substantially even with the reel axis, a pair of crop dividers extend from said bar on opposite sides thereof, each of said crop dividers comprises a fore-and-aft extending bar having a pointed forward end, and a cross brace extends from a forward end portion to an inward portion of said push bar.

6. An agricultural implement, as recited in claim 2, wherein said top shield has a pair of spaced laterally extending slots, a fastener extends through each of said brackets and into said slots, each of said side shields has a pair of longitudinally extending slots on an upper flange portion, a pair of fasteners extend through each of said brackets in register with said longitudinally extending slots, each of said brackets has a slot parallel to said laterally extending slots which receives one of said pair of fasteners, whereby the extent of lateral movement of said brackets and the extent of pivotal movement of said side shields is determined by the length of said slots.

7. An agricultural implement, as recited in claim 3, wherein a first slot is provided in said top shield between said two laterally spaced points, said swath divider is provided with a second slot which extends longitudinally along its upper edge, a portion of said second slot registers with said first slot as said swath divider is moved on said pivotal connection between said two points, a fastener insertable through said slots to secure said swath divider in an adjusted position.

8. In combination with a crop treating machine having a mobile frame adapted to travel forwardly through a field, a pair of rolls journalled in said frame with their axes parallel to each other and transverse to the direction of travel of said frame, a mower mounted on said frame forwardly of and below said rolls adjacent the ground for cutting a swath of crop material of the width substantially the length of said rolls, a guide plate extending between said mower and said rolls, a reel journalled on said frame above said mower and having crop engaging members which sweep rearwardly over said mower then upwardly and rearwardly along said guide plate to said rolls to deliver crop material thereto, said rolls delivering the crop material to a discharge region rearwardly of the rolls, a frame element in said discharge region extending transverse to the direction of travel of said crop material, a top shield on said frame element, side shields spaced on opposite ends of said frame element, said side shields extending rearwardly beyond said top shield and in a converging relationship, the crop material coming from said discharge region being consolidated by said shields, and discharged so that the material is formed into a windrow on the ground.

9. A crop treating machine, as recited in claim 8, wherein said side shields are detachably mounted to a pair of pivotal connections on said frame element, and a swath divider is adapted to be mounted to one of said pivotal connections when said side shields are detached from the machine.

10. A device for harvesting crop material comprising a mobile frame adapted to travel forwardly through a field, an elongated reel having a central axis and crop material engaging members, means rotatably driving said reel about its central axis in a direction to move said crop material engaging members in a path of travel downwardly at the front of said reel then rearwardly under said axis in close proximity to the ground and then upwardly and rearwardly behind the axis of said reel, cutting means carried by said frame and disposed generally under said reel between said path of travel of said crop material engaging members and the ground and operable to mow a swath of crop material whose width substantially equals the axial length of said reel, a pair of crop material conditioning rolls each having substantially the same axial length as said reel and cooperating to condition the stems of crop material passed therebetween, means journalling said rolls on said frame rearwardly of said reel and in close proximity thereto with the axes of said rolls parallel to each other and parallel to the axis of said reel, and means carried by said frame and having a crop material guiding surface extending upwardly and rearwardly from said cutting means toward said conditioning rolls generally parallel to and in close proximity to the path of travel of said crop material engaging members, said crop material engaging members engaging crop material forwardly of said cutting means and then sweeping said crop material rearwardly over said cutting means and then upwardly and rearwardly along said crop material guiding surface and between said conditioning rolls, a top shield located on said frame rearwardly and substantially parallel to said conditioning rolls, said top shield being above the discharge area of said rolls for guiding the discharged material downwardly and rearwardly, a pair of windrow forming side shields mounted on opposite sides of said frame, said side shields extending under said top shield and rearwardly thereof in a converging relationship, said side shields being pivotally mounted to said frame, a pair of adjusting brackets connected to each of said side shields and to said top shield, and said side shields being movable toward and away from the longitudinal centerline of said harvesting device about their respective pivotal mountings to adjust the windrow width.

11. A device for harvesting crop material comprising a mobile frame adapted to travel forwardly through a field, a pair of rolls which coact to condition the stems of crop material passed therebetween, means journalling said rolls on said frame with their axes parallel to each other and transverse to the direction of travel of said frame, said rolls defining therebetween a rearwardly converging crop material receiving bite, a mower mounted on said frame forwardly of and below said rolls adjacent the ground for cutting a swath of crop material of a width substantially the length of said rolls, a fixed crop material guiding plate on said frame extending upwardly and rearwardly from said mower toward the bite of said rolls, a reel having a central axis of rotation and crop material engaging members which travel in a circuitous path about said axis, journals on said frame mounting said reel in a position wherein said crop engaging members sweep rearwardly over said mower then upwardly and rearwardly along said material guiding plate to said bite of said rolls to deliver crop material cut by said mower directly into the bite of said rolls, a top shield located on said frame rearwardly of and substantially parallel to said conditioning rolls, said top shield being above the discharge area of said rolls for guiding the discharged material downwardly and rearwardly, a pair of windrow forming side shields mounted on opposite sides of said frame, said side shields extending under said top shield in a converging relationship, said side shields being pivotally mounted to said frame, said side shields being movable toward and away from the longitudinal center line of said harvesting device about their respective pivotal mountings to adjust the windrow width, and means for holding said side shields in an adjusted position.

References Cited

UNITED STATES PATENTS

| | | | |
|---|---|---|---|
| 2,521,999 | 9/1950 | Scott | 56—1 |
| 2,918,776 | 12/1959 | Coultas | 56—1 |
| 2,992,523 | 7/1961 | Oppel | 56—1 |
| 3,224,177 | 12/1965 | Adee | 56—1 |
| 3,241,300 | 3/1966 | Fell et al. | 56—1 |

ANTONIO F. GUIDA, *Primary Examiner.*